(12) United States Patent
Peiffer et al.

(10) Patent No.: US 7,122,240 B2
(45) Date of Patent: *Oct. 17, 2006

(54) MULTILAYER TRANSPARENT, BIAXIALLY ORIENTED POLYESTER FILM

(75) Inventors: Herbert Peiffer, Mainz (DE); Martin Mueller-Roosen, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 200 days.

This patent is subject to a terminal disclaimer.

(21) Appl. No.: 10/739,808

(22) Filed: Dec. 18, 2003

(65) Prior Publication Data

US 2004/0142147 A1 Jul. 22, 2004

Related U.S. Application Data

(63) Continuation of application No. 10/077,122, filed on Feb. 15, 2002, now abandoned.

(30) Foreign Application Priority Data

Feb. 26, 2001 (DE) ................................ 101 09 216

(51) Int. Cl.
*B32B 27/08* (2006.01)
*B32B 27/20* (2006.01)
*B32B 27/36* (2006.01)
*B32B 37/15* (2006.01)
*B32B 38/18* (2006.01)

(52) U.S. Cl. ...................... 428/141; 428/480; 428/910; 428/694 SG; 264/288.4; 264/290.2

(58) Field of Classification Search ...................... None
See application file for complete search history.

(56) References Cited

U.S. PATENT DOCUMENTS

| 3,515,626 | A | | 6/1970 | Duffield ...................... 161/162 |
| 4,818,581 | A | * | 4/1989 | Katoh et al. ................. 428/143 |
| 5,077,118 | A | * | 12/1991 | Hasegawa et al. .......... 428/149 |
| 5,294,474 | A | | 3/1994 | Assante et al. ............. 428/143 |
| 5,478,632 | A | * | 12/1995 | Kurz et al. .................. 428/212 |
| 5,612,138 | A | * | 3/1997 | Kurz et al. ............... 428/411.1 |
| 5,648,159 | A | * | 7/1997 | Sato ........................... 428/327 |
| 5,955,181 | A | * | 9/1999 | Peiffer et al. ............... 428/212 |
| 6,524,719 | B1 | * | 2/2003 | Yamane et al. ........... 428/474.7 |
| 6,607,808 | B1 | * | 8/2003 | Peiffer et al. ............... 428/141 |
| 6,627,295 | B1 | * | 9/2003 | Peiffer et al. ............... 428/141 |
| 6,630,224 | B1 | * | 10/2003 | Peiffer et al. ............... 428/141 |
| 2002/0160171 | A1 | * | 10/2002 | Peiffer et al. ............... 428/220 |
| 2004/0142194 | A1 | * | 7/2004 | Peiffer et al. ............... 428/500 |

FOREIGN PATENT DOCUMENTS

| DE | 1 694 404 | | 4/1971 |
| EP | 0 061 769 | A2 | 10/1982 |
| EP | 0 088 635 | A2 | 9/1983 |
| EP | 0 347 646 | A2 | 12/1989 |
| EP | 0 502 745 | A2 | 9/1992 |
| EP | 0 514 129 | A2 | 11/1992 |
| EP | 0 604 057 | A1 | 6/1994 |
| EP | 0 770 473 | A1 | 5/1997 |
| EP | 0 952 176 | A1 | 10/1999 |
| JP | 11322970 | A | 6/1994 |
| JP | 11322970 | A | 11/1999 |

OTHER PUBLICATIONS

Schimtz, Peter et al., "Films." Ullman's Encyclopedia of Industrial Chemistry, 5th Ed., vol. A11, pp. 85-95, 108-110.*
Schimtz, Peter et al., "Films," Ullmann's Encyclopedia of Industrial Chemistry, 5th Ed., vol. A11, pp. 85-95, 108-110.

* cited by examiner

*Primary Examiner*—Vivian Chen
(74) *Attorney, Agent, or Firm*—ProPat, L.L.C.

(57) ABSTRACT

The invention relates to a transparent, biaxially oriented polyester film composed of at least one base layer (B) which comprises at least 80% by weight of thermoplastic polyester, and of, applied to this base layer (B), a transparent, high-gloss outer layer (A). The outer layer (A) of the invention comprises a specific pigment system which provides improved winding of the film and leads to a highly transparent film with a high-gloss surface (A). The invention further relates to a process for producing the film. The film may be used as a packaging film, in particular for metalizing or for ceramic coating, or for applications in the industrial sector, e.g. as a substrate for stamping films, and in particular to its use on high-speed packaging machinery.

12 Claims, 2 Drawing Sheets

MULTILAYER TRANSPARENT, BIAXIALLY ORIENTED POLYESTER FILM

This application is a continuation of U.S. application Ser. No. 10/077,122 filed Feb. 15, 2002 abandoned, which is hereby incorporated by reference herein.

BACKGROUND OF THE INVENTION

The invention relates to a transparent, biaxially oriented polyester film made from at least one base layer (B) which comprises at least 80% by weight of thermoplastic polyester, and from, applied to this base layer (B), at least one transparent outer layer (A). The invention further relates to a process for producing the film and to the use of the film.

The outer layer (A) comprises a specific pigment system which provides improved winding of the film and leads to a highly transparent film with a high-gloss surface (A). The film has very high suitability for use as packaging film (in particular for metalizing or for ceramic coating) and for applications in the industrial sector (e.g. as a substrate for stamping films).

In the packaging industry there is a high level of demand for highly transparent and high-gloss plastic films, e.g. biaxially oriented polypropylene films or biaxially oriented polyester films. These highly transparent, high-gloss films have a characteristic appearance and give the packaging, for example, an appearance which is particularly attractive and therefore particularly effective for promotional purposes. The problem with films subject to high requirements for the optical properties of the film is, inter alia, their windability, which does not always meet the requirements set, in particular if the machine rolls are processed to give wide customer rolls of high running length.

The prior art shows how the optical properties, in particular the glass and the haze, of biaxially oriented polyester films can be improved.

EP-A-0 347 646 describes a biaxially oriented polyester film which has at least one outer layer (A) which comprises a concentration of from 0.5 to 50% of a filler, the diameter of this filler being in a particular ratio to the thickness of the outer layer. The outer layer also has a certain thickness and a certain degree of crystallization, which is determined with the aid of Raman spectroscopy. The topography of the outer layer A makes the film particularly suitable for magnetic recording tapes. The specification gives no information concerning the transparency of the film or the gloss achieved on the outer layer A. A film produced as in EP 347 646 did not have the desired transparency, nor the desired glossy surface. The gloss of this surface and the haze of the film are outside the range claimed in this specification.

EP-A-0 514 129 describes a transparent multilayer film which encompasses a primary layer substrate made from polymer material which has, at least on one of its surfaces, a secondary layer made from polymer material and having glass beads and silicon dioxide particles at particular concentrations and in particular size distribution. The arrangement of the secondary layer may be on one side or on both sides of the primary layer substrate. The film improves haze and processing properties, but the specification teaches nothing concerning improvement of the gloss and of the windability of the film.

EP-A-0 604 057 describes a transparent multilayer film which encompasses a primary layer substrate made from polymer material and substantially free from fillers, and having, at least on one of its surfaces, a secondary layer which is made from polymer material and which comprises a concentration of from 100 to 1000 ppm of silicone resin with a median particle diameter of from 1.5 to 12.5 µm. A disadvantage of the silicone particles is that these are comparatively expensive and do not represent an acceptable solution for the packaging market. In addition, films equipped with pigments of this type tend to telescope on winding. Nor does that specification give any indication at all as to how the topography of such a film is to be adjusted for simultaneous improvement of gloss and windability.

DE-A-16 94 404 describes a laminate with a plurality of layers of an oriented crystalizable thermoplastic film, in which at least one of the outer layers comprises an additive. The additives are conventional inert inorganic or organic particles which, in the case of the inert particles such as $SiO_2$, are added at a concentration of from 1 to 25% by weight to the outer layers. The particle size here is from 2 to 20 µm. The laminates may be metalized with aluminum for decorative purposes or used for magnetic tapes. Although the teaching of this specification enables the processing properties of the film to be improved, the specification gives no teaching concerning improvements of gloss and of the windability of the film.

EP-B-0 061 769 describes a magnetic recording medium composed of a biaxially oriented polyester film and of a thin magnetic metallic layer on the surface A of the polyester film. Where appropriate, there is also a lubricant layer present on the other surface B of the polyester film. The film is characterized in that the coated surface A a) has an average roughness $R_a$ (peak to valley value) of not more than 5 nm (60 nm), b) the number of the protrusions with a height of from 0.27 to 0.54 µm is from 0 to $0.2/mm^2$, and c) is free from protrusions with a height greater than 0.54 µm.

A disadvantage of the film is that the surface A tends to block, and the film therefore lacks good processability. The specification gives no teaching concerning the gloss of the film or its haze or windability.

EP-B-0 088 635 describes a coextruded biaxially oriented polyester film with at least two layers, of which one layer A is composed of thermoplastic resin and one layer B comprises thermoplastic resin and fine particles. The film is characterized in that the surface roughness $R_a$ of the outer surface of the layer A is less than 5 nm, and in that the outer surface of the layer B either i) is a surface with surface roughness $R_a$ of from 5 to 40 nm and has a large number of depressions and a large number of protrusions, these having a particular arrangement, or ii) is a surface which has protrusions formed on a flat plane, its surface being covered by a layer C which is composed of a lubricant and which has a surface roughness $R_a$ of from 5 to 40 nm.

A disadvantage of the film surface A is that it blocks against itself and against certain other surfaces (e.g. rubber rolls). The film cannot be processed cost-effectively, and in particular during vacuum-metalizing the high blocking tendency of the film gives it a tendency toward break-offs, and this can be associated with major cost-effectiveness problems. The film is not suitable for the object set. In addition, the film has unsatisfactory haze.

EP-B-0 502 745 describes a coextruded biaxially oriented polyester film with at least three layers, of which an outer layer A a) comprises inorganic particles with a mean primary particle size D in the range from 1 to 100 nm and complying with the equation D<T<200·D, where T is the thickness of layer A,
b) comprises particles B with a mean primary particle size D1 in the range from 0.3 to 2 μm and with a primary particle size distribution having a relative standard deviation of not more than 0.6, and
c) where the mean primary particle size D of the particles A is smaller than the mean primary particle size D1 of the particles B.

The teaching of this specification in particular improves the processing performance of the film. The specification gives no teaching concerning improvement of the gloss of the film, or of its haze or windability.

It was then an object of the present invention to provide a coextruded, biaxially oriented polyester film which has very good optical properties and in particular has very high gloss and very low haze. The film should, furthermore, be very easy to wind, in particular when the machine roll is processed to give wide customer rolls of high running length. In addition, the film is intended to be very easy to produce and to process and to provide a good oxygen barrier after metalizing or after coating with oxidic materials. In summary, the object was to provide a film with the following combination of features:

high gloss
low haze
good winding
low oxygen transmission of the film after metalizing or after coating with oxidic materials
low coefficients of friction.

The gloss of the film is intended to be greater than 170, and the haze lower than 2.5%. The film is intended to be very easy to wind, and this means in particular that there are to all intents and purposes no longitudinal corrugations in customer rolls produced from a machine roll. This applies in particular when these are wide customer rolls of high running length. It is intended that less than 1.0 cm$^3$ of oxygen per square meter and per day will diffuse through the metalized film when it is subjected to air at a pressure of 1 bar. In respect of other properties, the quality of the film is intended to be at least equal to that of the known packaging films of this type. The film is also intended to be simple and cost-effective to produce, and to be very easy to process on conventional machinery. The coefficient of friction on both surfaces is intended to be less than 0.6.

A further intention is to ensure that cut material arising during film production can be reintroduced to the manufacturing process as regrind in amounts of up to 60% by weight, based on the total weight of the film, without any resultant significant adverse effect on the physical or optical properties of the film.

BRIEF DESCRIPTION OF THE INVENTION

According to the invention, the object is achieved by providing a transparent, biaxially oriented polyester film made from at least one base layer (B) which comprises at least 80% by weight of thermoplastic polyester, and from at least one transparent, high-gloss outer layer (A), where the transparent outer layer (A) comprises an amount in the range from 0.05 to 0.5% by weight, based on the total weight of the outer layer (A), of a pigment system which has the following features
a) the median grain diameter ($d_{50}$) is in the range from 1.5 to 5 μm and
b) the spread of the distribution of the grain size, expressed by the SPAN 98, is less than or equal to 1.9.

The subclaims give preferred embodiments of the invention, and these are described in more detail below.

DETAILED DESCRIPTION OF THE INVENTION

Figure 1:
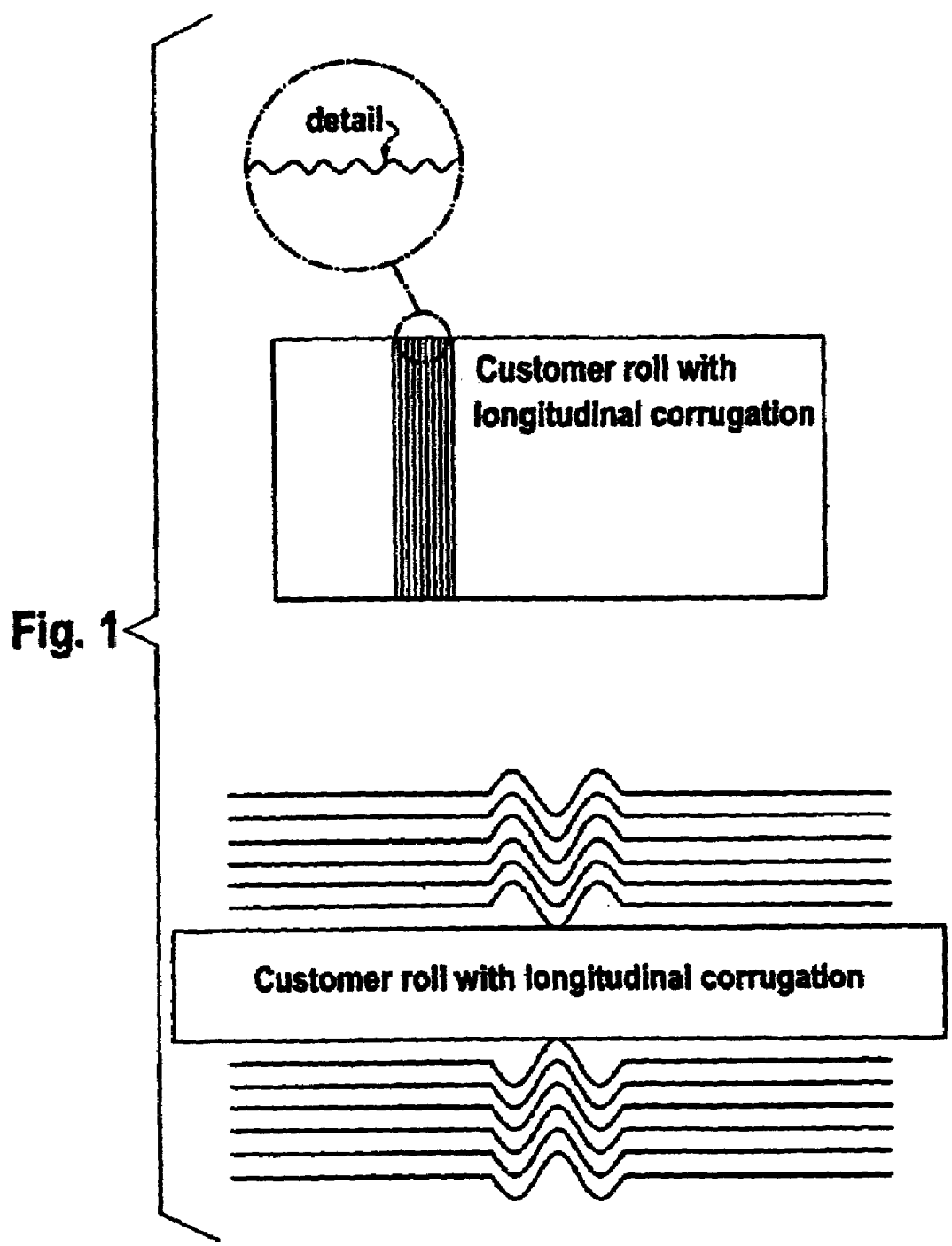
FIG. 1 shows a customer role with clearly visible corrugations.

According to the invention, the film has at least two layers and then encompasses the base layer (B) and the glossy outer layer (A).

The base layer (B) preferably comprises at least 90% by weight of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid [poly(-1,4-cyclohexanedimethylene terephthalate) PCDT], or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters of which at least 90 mol %, preferably at least 95 mol %, is composed of ethylene glycol units and terephthalic acid units, or of ethylene glycol units and naphthalene-2,6-dicarboxylic acid units. In one particularly preferred embodiment, the base layer is composed of polyethylene terephthalate homopolymer. The remaining monomer units derive from other aliphatic, cycloaliphatic or aromatic diols and, respectively, dicarboxylic acids.

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable. Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

For the outer layer (A) or other outer layers use may in principle be made of polymers which are the same as those used for the base layer (B). Besides these, there may also be other materials present in the outer layers, and in this case the outer layers are preferably composed of a mixture of polymers or of a copolymer or of a homopolymer which comprises ethylene isophthalate units and/or ethylene 2,6-naphthalate units and/or ethylene terephthalate units. Up to 10 mol % of the polymers may be composed of other comonomers.

To achieve the desired high gloss, the outer layer (A) comprises at least the pigment system of the invention, in an effective amount in the range from 0.05 to 0.5% by weight, based on the weight of the outer layer (A). In the preferred embodiment of the film of the present invention, the pigment concentration is in the range from 0.055 to 0.45% by weight, particularly preferably from 0.06 to 0.4% by weight.

Typical particle systems are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

It is also possible to select mixtures of two or more different pigment systems, or mixtures of pigment systems of the same chemical makeup but of different particle size. The particles may be added to the polymers of each layer of the film in the respective advantageous concentrations, e.g. as a glycolic dispersion during the polycondensation, or by way of masterbatches during extrusion.

To achieve the desired high gloss and the high transparency, there is a comparatively low level of filling of the outer layer (A) with inert particles. The concentration of the inert particles in the outer layer (A) in the preferred embodiment is from 0.055 to 0.45% by weight, and in the particularly preferred embodiment it is from 0.06 to 0.4% by weight, and is substantially dependent on the optical properties to be achieved by the film, and on its running properties.

If the concentration of the particles is greater than that prescribed, the desired optical properties (high transparency and high gloss) are no longer achieved. The film becomes cloudy and the surface becomes dull (matt). If, on the other hand, the concentration of the particles is smaller than that prescribed, this adversely affects the running properties and, respectively, the processing properties of the film. The surface of the film tends to block, making it impossible to ensure good processability, in particular on high-speed machinery.

Preferred particles are $SiO_2$ in colloidal or in chain-type form. These particles are bound very effectively into the polymer matrix.

It has been found that the grain diameter and the scattering (spread) of the diameter of the pigment system used affect the gloss, the haze, and in particular the windability of the film. It has been found that a smaller spread of the median diameter brings about a more uniform thickness of air layer between the laps of film and thus reduces any tendency toward blocking of the laps of film against one another, or, respectively, improves windability.

To achieve the lowest possible haze, the highest possible gloss, and good windability, the outer layer (A) of the film of the present invention comprises a pigment system in which the median diameter (the $d_{50}$) is in the range from 1.5 to 5.0 µm, and the spread (expressed via the SPAN 98) is less than 1.9.

In the preferred embodiment, the outer layer (A) of the film of the present invention comprises a pigment system in which the median diameter is in the range from 1.6 to 4.9 µm and the spread is less than 1.8. In the particularly preferred embodiment, the outer layer (A) of the film of the present invention comprises a pigment system in which the median diameter is in the range from 1.7 to 4.8 µm and the spread is less than 1.7.

If, in contrast, the outer layer (A) of the film comprises a pigment system in which the median diameter and the spread are outside the inventive range, this has a particularly adverse effect on the windability of the film. There can also be an adverse resultant affect on the transparency of the film and its gloss.

If the outer layer (A) of the film comprises a pigment system in which the median diameter is greater than 5.0 µm and the spread is greater than 1.9, there is in particular an adverse effect on the windability of the film. In these films there is an exacerbated tendency toward blocking of the film laps against one another. The customer rolls produced from the machine roll have an increased tendency toward formation of longitudinal corrugations, as illustrated in FIG. 1, where one or more corrugation(s) become(s) clearly visible around the periphery of the roll, this/these being more easily indented than the surroundings. These corrugations markedly restrict the processability and the use of the film. The longitudinal corrugations impressed into the films (in some cases irreversibly) are namely visible in the product during/after further processing (e.g. metalization, printing, stamped film application), and are an optical/mechanical defect impairing the usability of the film. Wide rolls (above 1.5 m) and rolls of high running length (greater than 24 000 m) in particular have a strong tendency toward formation of these longitudinal corrugations. In addition, it has been found that films with the abovementioned pigment system which is unfavorable for the purposes of the present invention have an exacerbated tendency toward loss of transparency and toward reduced gloss.

If, in contrast, the outer layer (A) of the film comprises a pigment system in which the median diameter is smaller than 1.5 µm and the spread is greater than 1.9, this likewise can become noticeable in impaired winding and impaired optical properties. The large number of small pigment particles (broad distribution of pigment system and small particle diameter) form a large number of scattering centers in the film, and these reduce not only the transparency of the film but also its gloss. Another result here is impairment of the windability of the roll, and indeed to the degree described above. These films also have a very pronounced tendency toward telescoping or off-center running of the rolls.

In one useful embodiment, the gloss-appearance outer layer (A) is described by the following further parameters:
   a) The roughness of the film, expressed by its $R_a$-value, is in the range from 30 to 150 nm, preferably from 35 to 140 nm, particularly preferably from 40 to 130 nm. Roughness values smaller than 30 nm have an adverse effect on running properties when the claimed pigment system is used, and values greater than 130 nm impair the optical properties of the film.

b) The value measured for surface gas flow is in the range from 4 to 200 s, preferably in the range from 5 to 180 s. At values above 200 the windability of the film is adversely affected.

The base layer (B) may also comprise customary additives, such as stabilisers and/or pigments (fillers). Phosphorous compounds, such as phosphoric acid or phosphoric esters, are advantageously used as stabilizers.

Typical pigments (fillers) for the base layer (B) are, as stated for the outer layer(s), inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the cadmium, barium, zinc, or manganese salts of the dicarboxylic acids used, carbon black, titanium dioxide, kaolin, or crosslinked polystyrene particles or crosslinked acrylate particles.

In one particularly advantageous embodiment, the base layer (B) comprises only the pigments introduced by way of the regrind. The film thus produced has particularly low haze.

In one advantageous embodiment, the film is composed of three layers, the base layer (B) and outer layers (A) and (C) applied to the two sides of this base layer, the outer layer (A) being high-gloss and comprising the inventive amount of pigment system. In one particularly advantageous embodiment, the three-layer film has a symmetrical structure and is composed of the base layer (B) and of, applied to the two sides of this base layer (B), outer layers (A) and (C), the outer layers (A) and (C) being high-gloss and comprising the inventive pigment system.

Between the base layer (B) and the outer layers there may, where appropriate, also be an intermediate layer. This may again be composed of the polymers described for the base layer (B). In one particularly preferred embodiment, the intermediate layer is composed of the polyester used for the base layer (B). The intermediate layer may also comprise the customary additives described. The thickness of the intermediate layer is generally greater than 0.3 µm, preferably in the range from 0.5 to 15 µm, in particular in the range from 1.0 to 10 µm, particularly preferably in the range from 1.0 to 5 µm.

In the particularly advantageous three-layered embodiment of the film of the invention, the thickness of the outer layers (A) and (C) is generally in the range from 0.1 to 5.0 µm, preferably in the range from 0.2 to 4.5 µm, and particularly preferably in the range from 0.3 to 4.0 µm, where the outer layers (A) and (C) may have identical or different thickness.

The overall thickness of the polyester film of the invention may vary within certain limits. It is from 3 to 80 µm, in particular from 4 to 50 µm, preferably from 5 to 30 µm, the base layer (B) making up a proportion which is preferably from 5 to 97% of the overall thickness.

The polymers for the base layer (B) and the two outer layers (A) and (C) are fed to three extruders for film production. Any foreign bodies or contamination present may be removed from the polymer melt prior to extrusion by way of suitable filters. The melts are then extruded through a coextrusion die to give flat melt films, and laminated. The multilayer film is then drawn off and solidified with the aid of a chill roll and, where appropriate, other rolls.

The invention also provides a process for producing the polyester film of the invention by the coextrusion process known from the literature.

The procedure for this process is that the melts corresponding to the separate layers (A), (B), and, where appropriate, (C) of the film are coextruded through a flat-film die, the resultant film is drawn off on one or more rolls for solidification, and the film is then biaxially stretched (oriented), and the biaxially stretched film is heat-set and, where appropriate, corona- or flame-treated on that surface intended for treatment, and is then wound up.

The biaxial stretching (orientation) is generally carried out sequentially, the type of sequential biaxial stretching preferred being that which begins with longitudinal stretching (in the machine direction) and then transverse stretching (perpendicularly to the machine direction).

As is usual in coextrusion, the polymer or the polymer mixtures for the separate layers is/are first compressed and plasticized in an extruder, at which juncture any additives used may already be present in the polymer or the polymer mixture. The melts are then simultaneously extruded through a flat-film die (slot die), and the extruded multilayer melt is drawn off on one or more take-off rolls, whereupon the melt cools and solidifies to form a prefilm.

The biaxial stretching is generally carried out sequentially, preferably stretching the prefilm first longitudinally (i.e. in the machine direction=MD) and then transversely (i.e. perpendicularly to the machine direction=TD). This leads to orientation of the polymer chains in space. The longitudinal stretching may be carried out with the aid of two rolls rotating at different speeds corresponding to the desired stretching ratio. For the transverse stretching, use is generally made of an appropriate tenter frame, clamping both edges of the film and then drawing toward the two sides at an elevated temperature.

The temperature at which the stretching is carried out may vary within a relatively wide range, and depends on the properties desired from the film. The longitudinal stretching is generally carried out at a temperature in the range from 80 to 130° C., and the transverse stretching in the range from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. After the longitudinal stretching and prior to the transverse stretching, one or both surfaces of the film may be in-line coated by known processes. The in-line coating may serve, for example, to give improved adhesion of a metal layer or of any printing ink subsequently to be applied, or else to improve antistatic performance or processing performance.

For producing a film with a good oxygen barrier (after appropriate metalization or after coating with ceramic substances), and with improved winding and improved transparency, it has proven advantageous for the planar orientation $\Delta p$ of the film to be greater than 0.165, preferably greater than 0.166, and very preferably greater than 0.167.

The significant variables affecting the planar orientation $\Delta p$ have been found to be the process parameters for longitudinal and transverse stretching, and also the SV of the raw material used. The process parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed, and the nature of the stretching, in particular that in the longitudinal direction of the machine. For example, if the planar orientation $\Delta p$ obtained on a machine is 0.163 using the parameter set $\lambda_{MD}$=3.7 and $\lambda_{TD}$=3.8, the stretching temperatures longitudinally and transversely being $T_{MD}$=80–123° C. and $T_{TD}$=80–126° C., then lowering the longitudinal stretching temperature to $T_{MD}$=80–118° C. or lowering the transverse stretching temperature to $T_{TD}$=80–122° C. or increasing the longitudinal stretching ratio to $\lambda_{MD}$=4.5 or increasing the transverse stretching ratio to $\lambda_{TD}$=4.0 gives a planar orientation $\Delta p$ within the desired range. The film web speed here was 370 m/min and the SV of the material was about 730. The data given for longitudinal stretching are based on what is known as LTEP stretching, composed of a low-level-orienting stretching step (LOE=Low Orientation Elongation) and of a highly orienting stretching step (REP=Rapid Elongation Process). The ratios obtained using other stretching equipment are in principle identical, but there may be very slight differences in the numerical values for the respective process parameters. The temperatures stated are based on the respective roll temperatures for longitudinal stretching and on the film temperatures measured by IR for transverse stretching.

In the heat-setting which follows, the film is held at a temperature of from 150 to 250° C. for a period of from about 0.1 to 10 s. The film is then wound up in the usual way.

After the biaxial stretching, it is preferable for one or both surfaces of the film to be corona- or flame-treated by one of the known methods. The intensity of treatment selected is generally such as to give the film a surface tension in the range above 45 mN/m.

The film may also be coated to achieve other desired properties. Typical coatings are layers with adhesion-promoting, antistatic, slip-enhancing, or release effect. It is, of course, possible for these additional layers to be applied to the film by in-line coating using aqueous dispersions prior to the transverse stretching step.

The film of the invention has excellent optical properties, i.e. high gloss and high transparency, very good winding performance, and very good processing performance.

In addition, it has been ensured that the cut material (regrind) arising during film production can be reintroduced to the extrusion process in amounts in the range from 20 to 60% by weight, based on the total weight of the film, without any significant resultant adverse effect on the physical properties of the film, in particular its appearance.

The film therefore has quite excellent suitability for use in flexible packaging, and specifically wherever its excellent processability can be utilized to full advantage, in particular on high-speed packaging machinery.

The table below (Table 1) gives the most important film properties of the invention again at a glance.

The following test methods were utilized for the purposes of the present invention to characterize the raw materials and the films:

SV (Standard Viscosity)

Standard viscosity SV (DCA) is measured in dichloroacetic acid by a method based on DIN 53726.

Intrinsic viscosity (IV) is calculated as follows from standard viscosity $IV(DCA) = 6.907 \cdot 10^{-4} SV(DCA) + 0.063096.$ Coefficient of Friction (COF)

Coefficient of friction was determined to DIN 53 375. The coefficient of sliding friction was measured 14 days after production.

Surface Tension

Surface tension was determined by what is known as the ink method (DIN 53 364).

Haze

Hölz haze was determined by a method based on ASTM-D 1003-52 but, in order to utilize the most effective measurement range, measurements were made on four laps of film laid one on top of the other, and a 1° slit diaphragm was used instead of a 4° pinhole.

Gloss

Gloss was determined to DIN 67 530. Reflectance was measured, this being an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Surface Gas Flow Time

The principle of the test method is based on the air flow between one side of the film and a smooth silicon wafer sheet. The air flows from the surroundings into an evacuated space, and the interface between film and silicon wafer sheet acts to resist the flow.

A round specimen of film is placed on a silicon wafer sheet in the middle of which there is a hole providing the

TABLE 1

|  | Inventive range | Preferred | Particularly preferred | Unit | Test method |
|---|---|---|---|---|---|
| Gloss, 20° | >170 | >175 | >180 |  | DIN 67530 |
| COF (Friction) | <0.6 | <0.55 | <0.50 |  | DIN 53375 |
| Average roughness $R_a$ | 30–150 | 35–140 | 40–130 | nm | DIN 4768. Cut-off of 0.25 mm |
| Range of values measured for surface gas flow | 4–200 | 5–180 | 6–160 | sec | internal |
| Other film properties |  |  |  |  |  |
| Haze | <2.5 | <2.3 | <2.1 | % | ASTM-D 1003–52 |
| Planar orientation $\Delta p$ (optional) | >0.165 | >0.166 | ≧0.167 |  | internal |
| Oxygen transmission after metalization of layer A | <1.0 | <0.95 | <0.9 | $cm^3/(m^2 \cdot d \cdot bar)$ | DIN 53380 | connection to the receiver. The receiver is evacuated to a pressure below 0.1 mbar. The time in seconds taken by the air to establish a pressure rise of 56 mbar in the receiver is determined.

| Test conditions: | |
|---|---|
| Test area | 45.1 cm$^2$ |
| Weight applied | 1276 g |
| Air temperature | 23° C. |
| Humidity | 50% relative humidity |
| Aggregated gas volume | 1.2 cm$^3$ |
| Pressure difference | 56 mbar |

Determination of Planar Orientation Δp

Planar orientation is determined by measuring the refractive index with an Abbe refractometer according to internal operating prescription 24.

Preparation of specimens:

Specimen size and length: from 60 to 100 mm

Specimen width: corresponds to prism width of 10 mm

To determine $n_{MD}$ and $n_a(=n_z)$, the specimen to be tested has to be cut out from the film with the running edge of the specimen running precisely in the direction TD. To determine $n_{TD}$ and $n_a(=n_z)$, the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.70. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_a(=n_z)$ of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_a(=n_z)$ are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Measurement of Median Grain Diameter $d_{50}$

The median grain diameter $d_{50}$ was determined by laser on a Malvern MasterSizer by the standard method (examples of other measurement devices are the Horiba LA 500 or Sympathec Helos, which use the same principle of measurement). For the tests, the specimens were placed in a cell with water, and this was then placed into the test device. The test procedure is automatic and includes the mathematical determination of the $d_{50}$ value.

Figure 2:
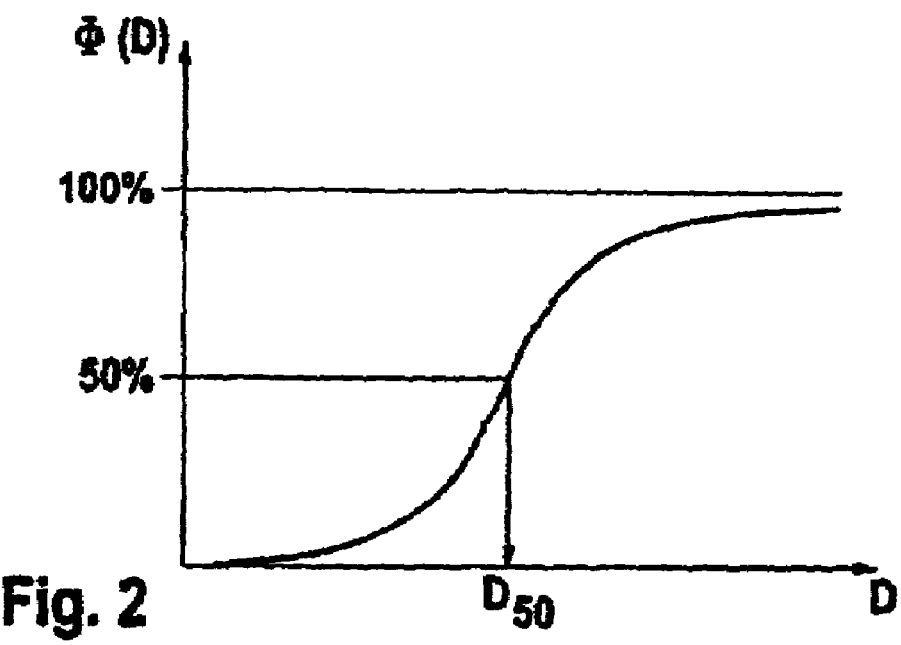
FIG. 2 shows a graph for the determination of $d_{50}$ of particles.

The $d_{50}$ value here is determined as defined from the (relative) cumulative particle size distribution curve: the point of intersection of the 50% ordinate with the cumulative curve directly gives the desired $d_{50}$ value on the abscissa axis, as shown more precisely in FIG. 2.

Measurement of SPAN 98

The test device used to determine SPAN 98 was the same as that described above for the determination of median diameter $d_{50}$. SPAN 98 is defined here as follows:

$$SPAN98 = \frac{d_{98} - d_{10}}{d_{50}}$$

Figure 3:
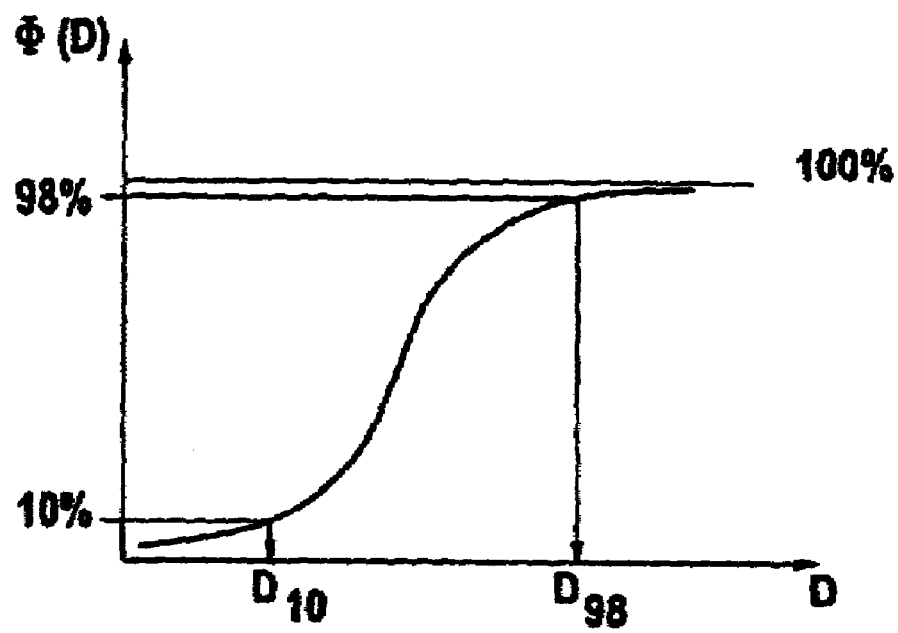
FIG. 3 shows a graph for the determination of $d_{10}$ and $d_{98}$ of particles.

The (relative) cumulative particle size distribution curve is again used as a basis for determining $d_{98}$ and $d_{10}$. The point of intersection of the 98% ordinate value with the cumulative curve gives the desired $d_{98}$ value directly on the abscissa axis, and the point of intersection of the 10% ordinate value with the cumulative curve gives the desired $d_{10}$ value directly on the abscissa axis, as shown more precisely in FIG. 3.

EXAMPLE 1

Chips made from polyethylene terephthalate (prepared by the transesterification process with Mn as transesterification catalyst, Mn concentration: 100 ppm) were dried at 150° C. to residual moisture below 100 ppm and fed to the extruder for the base layer (B).

Alongside this, chips were prepared from a polyethylene terephthalate (prepared by the transesterification process with Mn as transesterification catalyst, Mn concentration: 100 ppm) and dried at a temperature of 150° C. to residual moisture below 100 ppm, and fed, together with the filler of the invention, to the extruders for the outer layers (A) and (C).

A transparent, three-layer film of ABC structure and with a total thickness of 12 μm was then produced by coextrusion followed by stepwise longitudinal and transverse orientation. The thickness of each outer layer is given in Table 2.

Outer layer (A) was a mixture made from:

| | |
|---|---|
| 90% by weight of | polyethylene terephthalate with SV of 800 and |
| 10% by weight of | masterbatch made from 99% by weight of polyethylene terephthalate and 1.0% by weight of silica particles (® Sylysia 430 from Fuji, Japan) with $d_{50}$ value of 2.5 μm and SPAN 98 of 1.4. |

Base layer (B):

| | |
|---|---|
| 100.0% by weight of | polyethylene terephthalate with SV of 800 |

Outer layer (C) was a mixture made from:

| | |
|---|---|
| 90.0% by weight of | polyethylene terephthalate with SV of 800 and |
| 10.0% by weight of | masterbatch made from 99% by weight of polyethylene terephthalate, 1.0% by weight of silica particles (® Sylysia 320 from Fuji, Japan) with $d_{50}$ of 2.5 μm and SPAN 98 of 1.4. |

The production conditions in each step of the process were:

| | | | |
|---|---|---|---|
| Extrusion: | Temperatures | Layer A: | 290° C. |
| | | Layer B: | 290° C. |
| | | Layer C: | 290° C. |
| | Die width: | | 3.5 mm |
| | Take-off roll temperature: | | 30° C. |
| Longitudinal stretching: | Stretching temperature: | | 80–126° C. |
| | Longitudinal stretching ratio: | | 4.5 |
| Transverse stretching: | Stretching temperature: | | 80–135° C. |
| | Transverse stretching ratio: | | 4.0 |
| Setting: | Temperature: | | 230° C. |
| | Duration: | | 3 s |

The film had the required high gloss and the required low haze. The film also has the desired winding performance and the desired processing performance. The structure of the film and the properties achieved in films produced in this way are shown in Tables 2 and 3.

EXAMPLE 2

With Example 1 as a basis, the outer layer thickness for the glossy outer layers (A) and (C) was raised from 1.0 to 1.5 μm while the remainder of the film structure and the production method were identical. The result was an improvement in the winding performance of the film. The gloss of the film reduced marginally and the haze increased marginally.

EXAMPLE 3

Using Example 1 as a basis, the pigment concentrations in the outer layers (A) and (C) were now increased. The result was a marginal reduction in the gloss of the film and a marginal increase in the haze. In contrast, however, there was a further improvement in windability.

EXAMPLE 4

Using Example 3 as a basis, the outer layer thickness of the glossy outer layers (A) and (C) was raised from 1.0 to 1.5 μm while the film structure and the method of production were identical. The result was a further slight increase in the winding performance of the film, but the gloss reduced substantially and the haze increased substantially.

EXAMPLE 5

Using Example 2 as a basis, the grain diameter in the outer layers (A) and (C) was now increased at identical SPAN values. The result was a marginal reduction in the gloss of the film and a marginal increase in the haze. In contrast, there was a further improvement in windability.

EXAMPLE 6

Using Example 2 as a basis, another pigment system was added to the glossy outer layers (A) and (C). Other than the abovementioned pigments, the two outer layers now also comprise 500 ppm of ®Aerosil TT 6000 (from Degussa), this being a fumed silica.

EXAMPLE 7

Using Example 6 as a basis, the coarser pigment Sylysia 340 was now used in the glossy outer layers (A) and (C) instead of Sylysia 320.

COMPARATIVE EXAMPLE 1

Using Example 1 as a basis, the outer layers (A) and (C) were now formulated with a pigment system of the prior art as in U.S. Pat. No. 3,154,461. The windability of the film deteriorated markedly, and the optical properties also deteriorated.

| | Film thickness | Film | Layer thicknesses μm | | | Pigments in layers | | | Median pigment diameter in layers μm | | | Pigment concentrations ppm | | |
|---|---|---|---|---|---|---|---|---|---|---|---|---|---|---|
| Example | μm | structure | A | B | C | A | B | C | A | B | C | A | B | C |
| E 1 | 12 | ABC | 1.0 | 10 | 1.0 | Sylysia 320 | none | Sylysia 320 | 2.5 | | 2.5 | 1000 | 0 | 1000 |
| E 2 | 12 | ABC | 1.5 | 9 | 1.5 | Sylysia 320 | none | Sylysia 320 | 2.5 | | 2.5 | 1000 | 0 | 1000 |
| E 3 | 12 | ABC | 10 | 10 | 1.0 | Sylysia 320 | none | Sylysia 320 | 2.5 | | 2.5 | 1800 | 0 | 1800 |
| E 4 | 12 | ABC | 1.5 | 9 | 1.5 | Sylysia 320 | none | Sylysia 320 | 2.5 | | 2.5 | 1800 | 0 | 1800 |
| E 5 | 12 | ABC | 1.5 | 9 | 1.5 | Sylysia 430 | none | Sylysia 430 | 3.4 | | 3.4 | 1000 | 0 | 1000 |
| E 6 | 12 | ABC | 1.5 | 9 | 1.5 | Sylysia 320 Aerosil TT 600 | none | Sylysia 320 Aerosil TT 600 | 2.5 0.05 | | 2.5 0.05 | 1000 500 | 0 | 1000 500 |
| E 7 | 12 | ABC | 1.5 | 9 | 1.5 | Sylysia 430 Aerosil TT 600 | none | Sylysia 430 Aerosil TT 600 | 3.4 0.05 | | 3.4 0.05 | 1000 500 | 0 | 1000 500 |

-continued

| Example | Film thickness μm | Film structure | Layer thicknesses μm A | B | C | Pigments in layers A | B | C | Median pigment diameter in layers μm A | B | C | Pigment concentrations ppm A | B | C |
|---|---|---|---|---|---|---|---|---|---|---|---|---|---|---|
| CE 1 | 12 | ABC | 1.5 | 9 | 1.5 | $d_{50}$ = 5.5 SPAN 98 = 2.2 | none | $d_{50}$ = 5.5 SPAN 98 = 2.2 | 5.0 | 0.04 | 2.5 | 1000 | 0 | 1000 |

TABLE 3

| Example | Section COF Side A against Side C | Average roughness $R_a$ Side A | Side C | Values measured for gas flow Side A | Side C | Δp | Gloss Side A | Gloss Side C | Haze | Winding performance and handling Side A | Processing performance Side C |
|---|---|---|---|---|---|---|---|---|---|---|---|
| E 1 | 0.46 | 55 | 55 | 85 | 85 | 0.167 | 200 | 200 | 1.6 | + | + |
| E 2 | 0.45 | 60 | 60 | 82 | 82 | 0.167 | 198 | 197 | 1.65 | +(+) | +(+) |
| E 3 | 0.43 | 63 | 62 | 79 | 78 | 0.167 | 192 | 192 | 1.8 | ++(+) | ++(+) |
| E 4 | 0.43 | 64 | 63 | 78 | 76 | 0.167 | 190 | 189 | 1.8 | +++ | +++ |
| E 5 | 0.42 | 85 | 83 | 25 | 26 | 0.167 | 194 | 194 | 1.5 | +++ | +++ |
| E 6 | 0.40 | 62 | 62 | 80 | 80 | 0.167 | 192 | 192 | 1.8 | ++(+) | ++(+) |
| E 7 | 0.41 | 85 | 84 | 25 | 26 | 0.167 | 191 | 193 | 1.7 | ++++ | ++++ |
| CE 1 | 0.48 | 55 | 50 | 90 | 90 | 0.167 | 190 | 190 | 1.75 | − | − |

Key to winding performance and processing performance of films:
++++: no tendency toward adhesion to rolls or other mechanical parts, no blocking problems, and no longitudinal corrugations on winding, very good processing performance
+++: no tendency toward adhesion to rolls or other mechanical parts, no blocking problems, and no longitudinal corrugations on winding, good processing performance
++: no tendency toward adhesion to rolls or other mechanical parts, no blocking problems, and no longitudinal corrugations on winding, satisfactory processing performance
+: no tendency toward adhesion to rolls or other mechanical parts, no blocking problems, and on winding at most one narrow longitudinal corrugation not irreversibly impressed, satisfactory processing performance
−: tendency toward adhesion to rolls or other mechanical parts, blocking problems, and longitudinal corrugations on winding, and poor processing on packaging machinery

The invention claimed is:

1. A multilayer, transparent, biaxially oriented polyester film made from at least one base layer (B) which comprises at least 80% by weight of thermoplastic polyester, and from, applied to this base layer (B), at least one transparent, polyester high-gloss outer layer (A), wherein the transparent outer layer (A) also comprises an amount in the range from 0.05 to 0.5% by weight, based on the total weight of the outer layer (A), of a single pigment system which has the following features:
   a) the median grain diameter ($d_{50}$) is in the range from 1.5 to 5 μm and
   b) the spread of the distribution of the grain size, expressed by the SPAN 98, is less than or equal to 1.9, wherein said film is a packaging film exhibiting an average surface roughness, $R_a$ of 35 to 150 nm; a haze of less tan 2.5% and a gloss of greater than 170 measured at 20°.

2. The multilayer, transparent polyester film as claimed in claim 1, wherein the transparent outer layer (A) comprises the single pigment system which has a median grain diameter ($d_{50}$) in the range from 1.6 to 4.9 μm.

3. The multilayer, transparent polyester film as claimed in claim 1, wherein the transparent outer layer (A) comprises a pigment system which has a SPAN 98 of less than or equal to 1.8.

4. The multilayer, transparent polyester film as claimed in claim 1, which has a three-layer structure with a base layer (B) and, arranged on the two sides of the base layer (B), outer layers (A) and (C), and which has an overall thickness in the range from 3 to 80 μm, and wherein the thickness of the outer layers (A) and (C) is in the range from 0.1 to 5 μm, and wherein outer layers (A) and (C) are of identical or different thickness.

5. The multilayer, transparent polyester film as claimed in claim 1, whose roughness, expressed as its $R_a$ value, is in the range from 30 to 150 nm, and whose value measured for surface gas flow is in the range from 4 to 200 s.

6. The multilayer, transparent polyester film as claimed in claim 1 whose planar orientation Δp is greater than or equal to 0.165.

7. A process for producing a multilayer, transparent polyester film as claimed in claim 1 by coextrusion, by first compressing, plasticizing, and thereby homogenizing the polyesters of the respective layers in extruders, at which juncture any additives used may already be present in the respective polymer, and then by pressing the melts through a flat-film coextrusion die, and drawing off the extruded multilayer film on one or more take-off rolls and solidifying the same to give a prefilm, and then biaxially stretching the solidified prefilm, and heat-setting the biaxially stretched film and, where appropriate, corona- or flame-treating the same on that surface intended for treatment, which comprises using a longitudinal stretching temperature in the range from 80 to 130° C. and using a transverse stretching temperature in the range from 90 to 150° C., and which comprises using a longitudinal stretching ratio in the range from 2.5:1 to 6:1, and using a transverse stretching ratio in the range from 3.0:1 to 5.0:1.

8. The process as claimed in claim 7, wherein, after stretching, the film is heat-set for a period in the range from 0.1 to 10 s at a temperature of from 150 to 250° C.

9. The process as claimed in claim 7, wherein one or both surfaces of the film is/are also corona- or flame-treated, the intensity of treatment set being such as to give the film a surface tension in the range greater than or equal to 45 mN/m.

10. The process as claimed in claim 7, wherein cut material arising during film production is reintroduced as regrind to the extrusion process in amounts in the range from 20 to 60% by weight, based on the total weight of the film.

11. The multilayer, transparent polyester film as claimed in claim 1, wherein the transparent outer layer (A) is formed from polyester consisting essentially of polyethylene terephthalate, poly(1,4-cyclohexanedimethylene terephthalate), polyethylene 2,6-naphthalate bibenzoate or mixtures or copolymers thereof.

12. A multilayer, transparent biaxially oriented polyester film made from at least one base layer (B) which comprises at least 80% by weight of thermoplastic polyester, and from, applied to this base layer (B), at least one transparent, polyester high-gloss outer layer (A), wherein the transparent outer layer (A) also comprises an amount in the range from 0.05 to 0.5% by weight, based on the total weight of the outer layer (A), of a single pigment system which has the following features:
a) the median grain diameter ($d_{50}$) is in the range from 1.5 to 5 μm and
b) the spread of the distribution of the grain size, expressed by the SPAN 98, is less than or equal to 1.9,
wherein said film has a planar orientation $\Delta p$ of greater than or equal to 0.165 and an oxygen transmission after metallization of less than 1.0 $cm^3/(m^2 \cdot d \cdot bar)$.

* * * * *